April 17, 1934.  L. A. SMITH  1,955,258
EGG SERVING DEVICE
Filed March 14, 1932
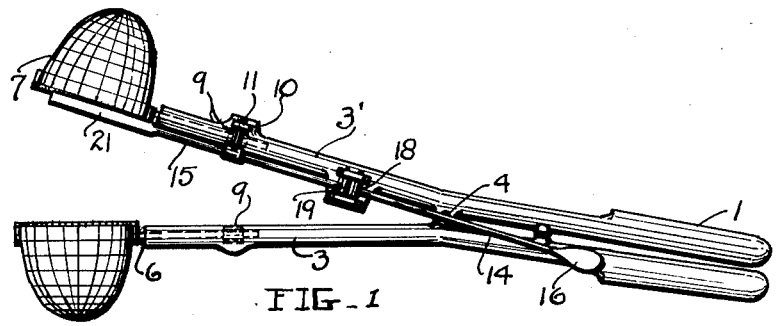
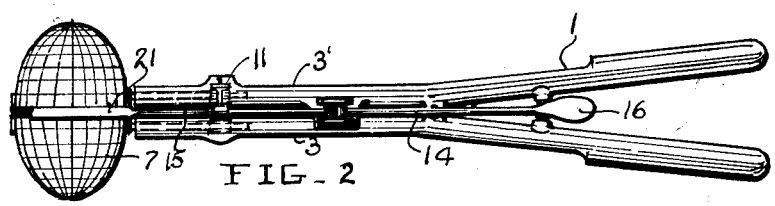
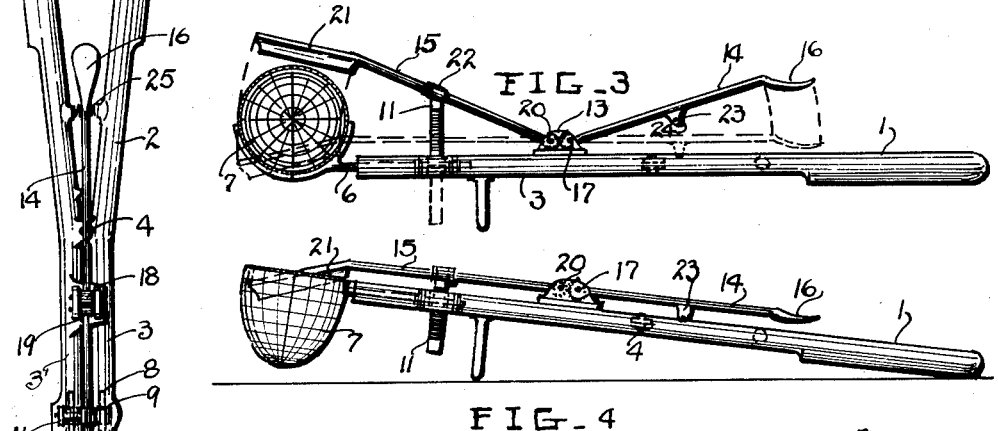
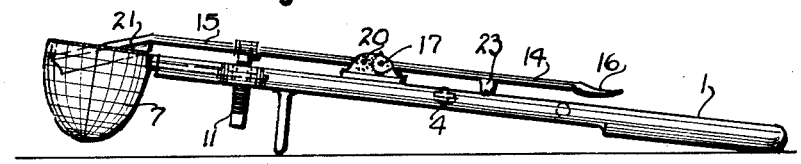
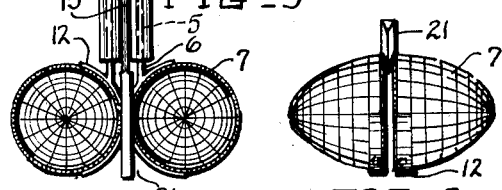
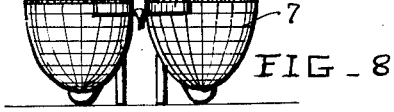
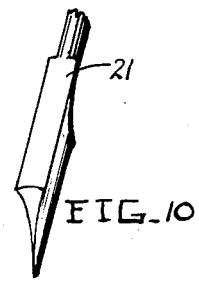
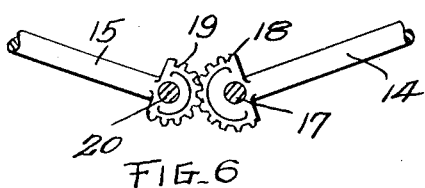
INVENTOR.
LYNDON A. SMITH
BY
Jesse R. Stone
Lester B. Clark
ATTORNEYS Patented Apr. 17, 1934

1,955,258

UNITED STATES PATENT OFFICE 1,955,258

EGG SERVING DEVICE

Lyndon A. Smith, Houston, Tex.

Application March 14, 1932, Serial No. 598,679

6 Claims. (Cl. 146—2)

My invention relates to a device for handling eggs in serving them for the table.

The object of the invention is to provide a utensil for removing the egg from the hot water and opening the egg for serving.

The invention includes a structure for enclosing the egg while it is in the hot water, removing it therefrom, and severing it into two parts, so that it may be easily handled thereafter.

I contemplate the provision of a utensil which is of simple construction and which may be easily handled in serving eggs for the table. The device includes means for grasping and holding the egg, for severing the egg into equal portions, and for then exposing the parts for ready removal of the egg from the shell.

The particular invention resides in the construction and arrangement of the parts making up the device and reference is made to the drawing herewith wherein the structure thereof will be more readily understood.

Fig. 1 is a top plan view of my improved device shown with the parts in open position and the knife raised.

Fig. 2 is a similar view with the parts in closed position.

Fig. 3 is a side elevation of the device shown in Fig. 2.

Fig. 4 is a similar view with the knife in lowered position and the egg holding basket in open position.

Fig. 5 is a top plan view of the structure as shown in Fig. 4.

Fig. 6 is a broken detail illustrating the geared connection between the levers which operate the knife.

Fig. 7 is an end view of the egg-retaining members with the knife in position ready to sever the egg.

Fig. 8 is a similar end view with the egg-holding members in open position and the knife lowered.

Fig. 9 is a detail illustrating the means for rotating the egg-holding baskets to open position.

Fig. 10 is a perspective view somewhat enlarged and illustrating the knife structure.

My device includes two handles 1, the forward ends being inclined inwardly toward each other at 2 and connecting with the operating arms 3, which extend forwardly in parallel relation. These two handles are hinged together for operation at 4. Thus the two handles with the operating arms thereon may be manipulated somewhat as is a pair of shears.

At the forward ends of the operating arms 3 are longitudinal bores or sockets 5, within which the rods 6 upon the basket members 7 may rotate. These sockets extend longitudinally of the operating arms 3 from the inner end to the point indicated at 8. Adjacent the ends of said rods 6, which fit said sockets, the inner sides of the operating arms 3 are recessed to house the small gears 9, fixed upon the rods 6 previously referred to.

As will be noted from Fig. 1, one gear 9 is housed in one of the arms 3, while the other arm 3' has a gear similarly housed therein, and on the other side of said arm 3' is a transverse opening 10, through which a rack 11 may project and mesh with the gear 9 adjacent thereto. When said rack is reciprocated through the opening it will rotate the adjacent gear and said gear will, when the arms are in closed position, engage with the adjacent gear 9 upon the other arm in the manner shown in Fig. 9. The rack 11 is pushed downwardly by means of the finger 11' on the arm 3', as seen in Fig. 9, and one of the rods 6 will be rotated in one direction and the adjacent rod 6 will be rotated in the opposite direction.

The baskets 7 are of any preferred foraminated construction. I have shown them of woven wire. The two baskets when assembled in position are nearly egg-shaped. Around the inner side of each basket is a metal plate 12, to which the rod 6 is secured. These arcuate metal plates 10 extend approximately half way around the basket adjacent their lower edges.

With reference particularly to Figs. 3 and 4, the knife structure will be understood. Formed upon the arm 3' of the handle member is a bracket or support 13, which extends above the arm and furnishes a support for two interconnecting levers 14 and 15. The lever 14 has a handle 16 at its outer end and at its inner end it is pivoted at 17 to the plate 13. Its end is formed with an arc-shaped gear 18 thereon, as will be best seen in Fig. 6.

The gear 18 meshes with an adjacent gear 19 of shorter radius fixed upon the outer end of the lever 15. Said lever 15 is pivoted at 20 to the bracket or plate 13 and has at its forward end a knife 21. Between the knife and the geared end of the lever 15 is a cylindrical sleeve or bushing 22 to which is secured the rack 11 previously referred to. Thus, with reference to Fig. 3, when the handle 16 is depressed the lever arm 15 will be also depressed to throw the knife 21 downwardly between the two halves of the egg-retaining baskets. When the knife thus descends the operation of the rack 11 will cause the rotation of the rods 6 upon which the baskets are supported and will move them simultaneously into the open position shown in Fig. 8, the knife thus descending to sever the egg as the baskets are rotated to open position. The knife 21 may be of any preferred construction. My preferred form is shown in Fig. 10.

The handle 14 may have a latching member 23 thereon approximately midway between its ends. This latching member comprises a downwardly extending boss formed on the lever arm with a nose 24 on one side thereof adapted to engage with the adjacent side of the handle member 1. This will tend to hold the lever arm 14 in depressed position but will be readily releasable by an upward pull on said handle.

I may provide between the adjacent handle members 1 a spring 25, which acts to move the handles apart under normal circumstances.

It will be now understood that when this device is to be operated the knife will be in raised position, as shown in Fig. 3. The handles 1 will be forced toward each other to open the baskets into the Fig. 1 position. The egg may then be dipped from the hot water and will be engaged by allowing the handles to open, closing the basket to retain the egg therein. The device will then be moved to the position where the egg is to be opened and the knife will be forced downwardly to sever the egg, while the basket is simultaneously opened into the Fig. 8 position, so that the two halves of the severed egg are exposed so that the egg may be removed therefrom with a spoon.

It will be obvious that the device is easily manipulated and will enable the operator to handle eggs while they are hot and remove them from the hot water and serve them easily and expeditiously without the usual difficulties occasioned by handling eggs while they are hot. It will enable the user to serve eggs while they are hot without the necessity of cooling the eggs as is usually done. The advantages will be obvious to those skilled in the art.

Having described my invention, what I claim is:

1. In a device of the character described, a pair of foraminated baskets adapted to contain an egg, means to move said baskets to enclose the egg, a knife operative to divide said egg into two parts, and means operating in response to the movement of said knife to rotate said baskets to expose the divided egg.

2. A device such as is set forth in claim 1 in which the baskets are rotated simultaneously with the operation of said knife.

3. In a device of the character described, an egg container divided transversely into two parts, a pair of arms recessed axially thereof at their ends, rods on said container parts rotatable in said recessed ends, means to rotate said container parts and knife means movable transversely between said parts.

4. A foraminated basket shaped to contain a single egg, a handle on said basket, means to transversely divide said egg into two parts while in said basket, and means mounted on said handle and operable independently thereof to open said basket to expose the parts of the divided egg.

5. A pair of handle members hinged together between their ends, baskets shaped to contain an egg rotatably supported on axes longitudinally in said handle members, and means to rotate said baskets on said members.

6. A pair of handle members hinged together between their ends, baskets shaped to contain an egg rotatably supported axially of said handle members, a knife mounted on one of said handle members, means to operate said knife to move the same between said baskets, and means to rotate said baskets on their axes in said members.

LYNDON A. SMITH.